(12) United States Patent
Mohammed

(10) Patent No.: US 12,104,537 B1
(45) Date of Patent: Oct. 1, 2024

(54) ENGINE ACCESSORY FIRE SHIELD

(71) Applicant: PRATT & WHITNEY CANADA CORP., Longueuil (CA)

(72) Inventor: Kashif Mohammed, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/193,109

(22) Filed: Mar. 30, 2023

(51) Int. Cl.
*F02C 7/25* (2006.01)
*F02C 7/14* (2006.01)
*F02C 7/18* (2006.01)

(52) U.S. Cl.
CPC .................. *F02C 7/25* (2013.01); *F02C 7/14* (2013.01); *F02C 7/18* (2013.01)

(58) Field of Classification Search
CPC .... F02C 7/12; F02C 7/14; F02C 7/141; F02C 7/16; F02C 7/18; F02C 7/25; B64D 33/08; B64D 33/10; B64D 25/00; F05D 2260/20; F05D 2260/213; F05D 2300/505; F16K 31/002; F16K 99/0038; F28F 27/02; A62C 3/08; F01P 11/10; F01P 7/10; F01P 7/12; F03G 7/065
See application file for complete search history.

(56) References Cited

U.S. PATENT DOCUMENTS

| | | |
|---|---|---|
| 6,330,157 B1 | 12/2001 | Bezama et al. |
| 10,358,970 B2 | 7/2019 | Brinkmann et al. |
| 10,473,226 B2 | 11/2019 | Simpson |
| 2005/0151017 A1* | 7/2005 | Noiseux ................ B64D 33/10 244/129.2 |
| 2014/0036069 A1 | 12/2014 | van Schoor et al. |
| 2020/0147425 A1* | 5/2020 | Wright .................. A62C 2/247 |

* cited by examiner

*Primary Examiner* — Loren C Edwards
(74) *Attorney, Agent, or Firm* — NORTON ROSE FULBRIGHT CANADA LLP

(57) ABSTRACT

A fire protection device for an accessory of an aircraft engine includes a baffle located within an airflow passage in communication with the accessory, the baffle having fire shield elements made of a shape memory alloy. The fire shield elements are deformable between a deformed state and a natural state, wherein in the natural state the fire shield elements extend at least partially across the airflow passage to protect the accessory from flames, and in the deformed state the fire shield elements is bent to define one or more gaps between the fire shield elements in the air flow passage thereby allowing airflow through the baffle.

17 Claims, 7 Drawing Sheets

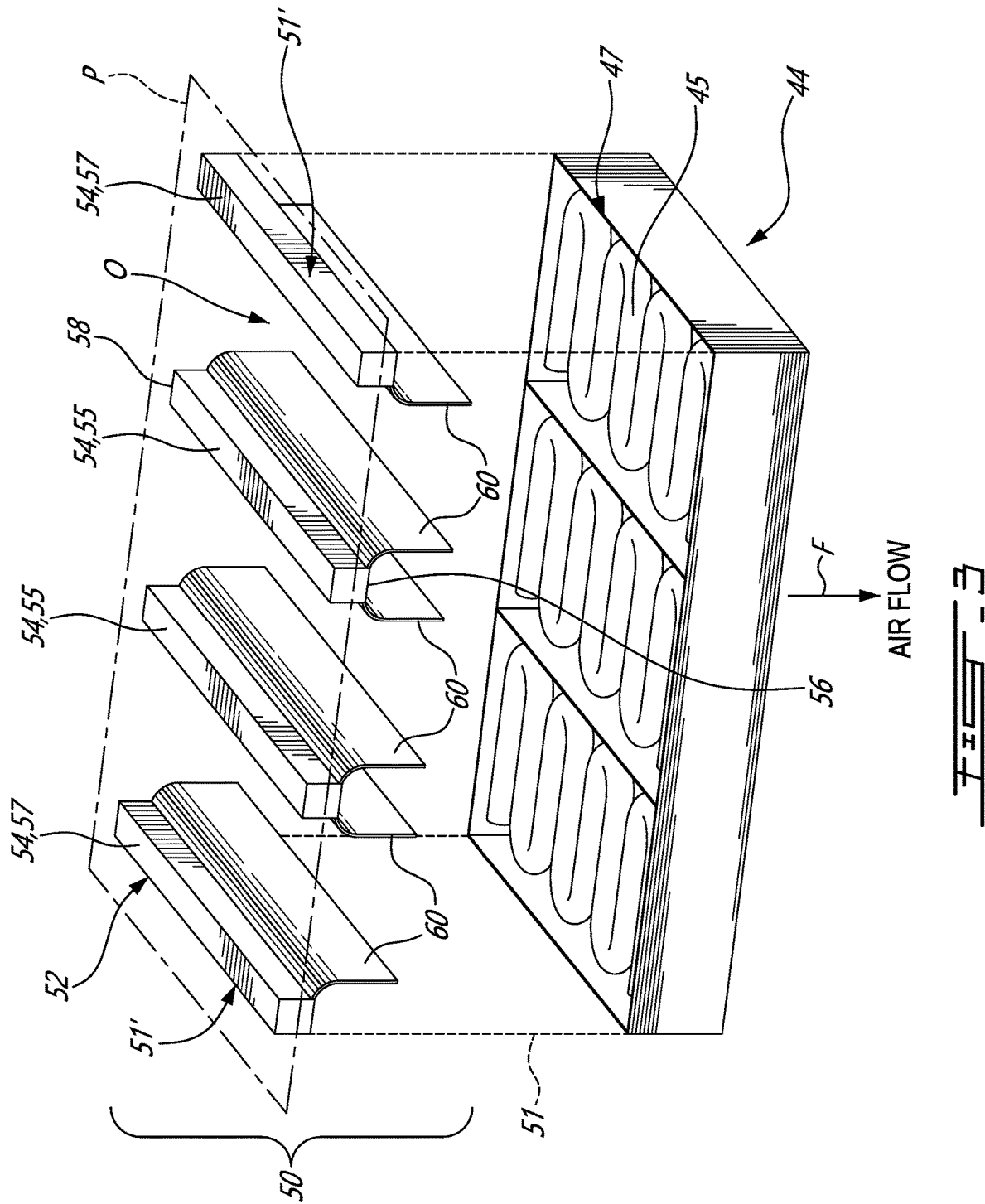

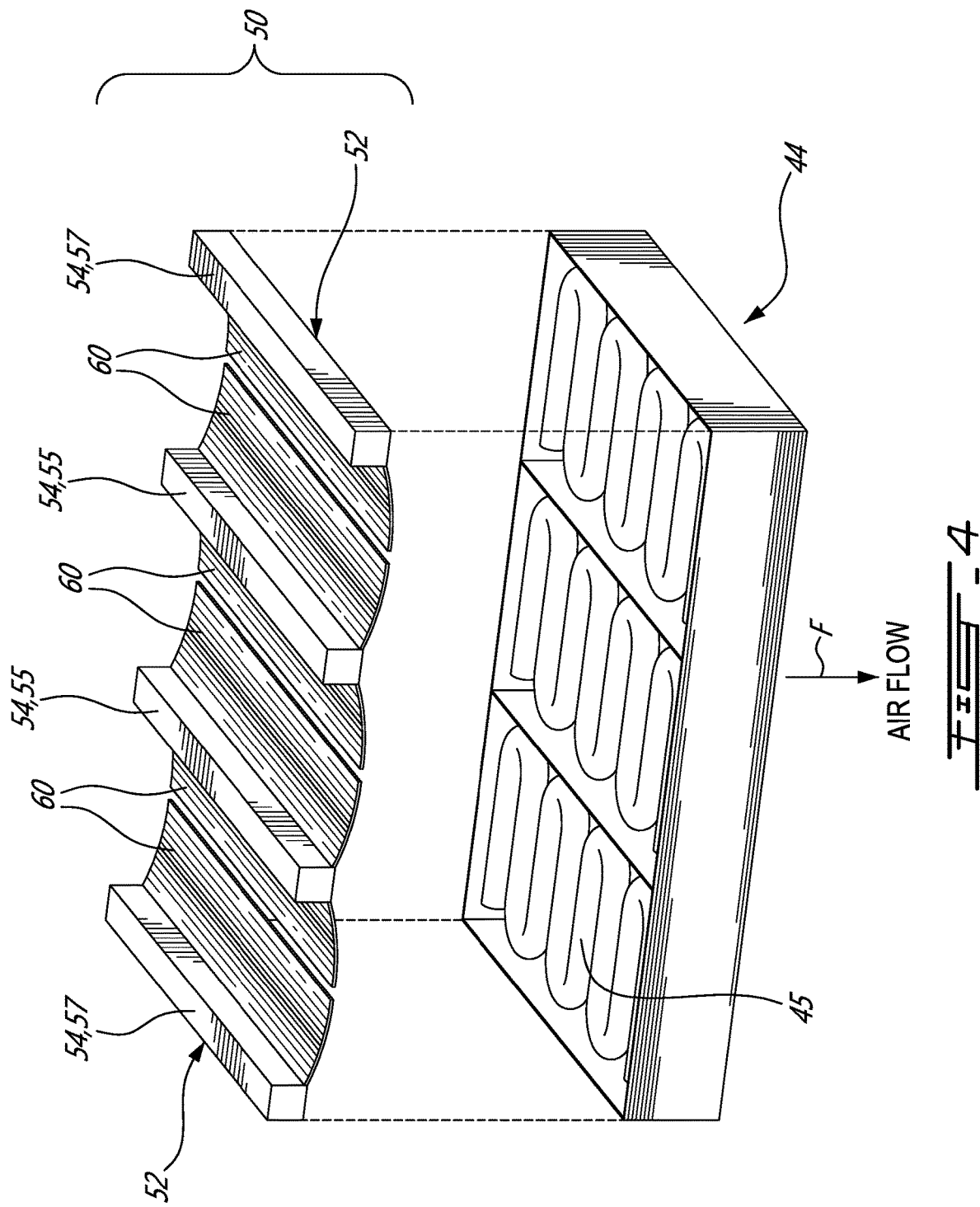

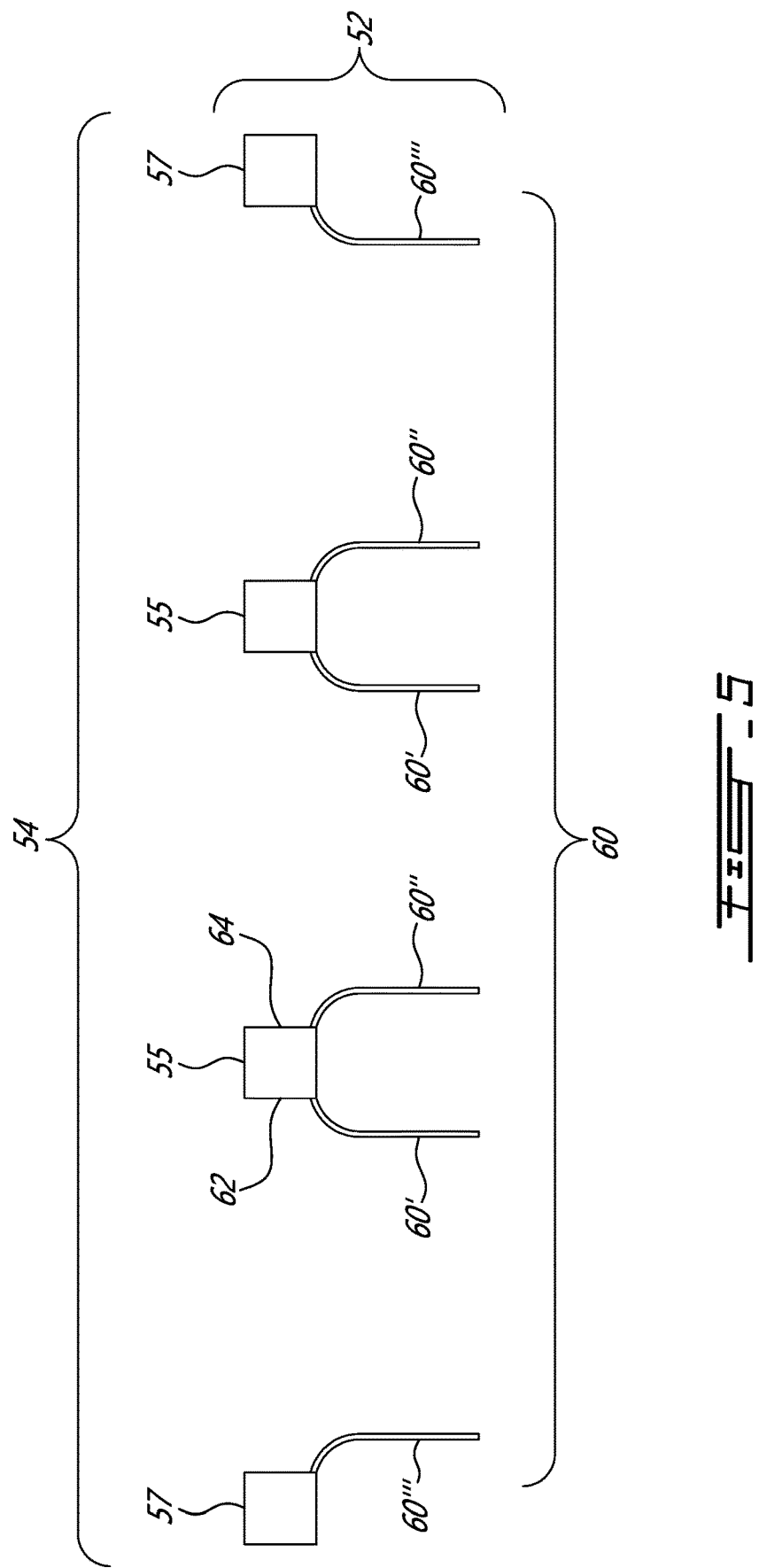

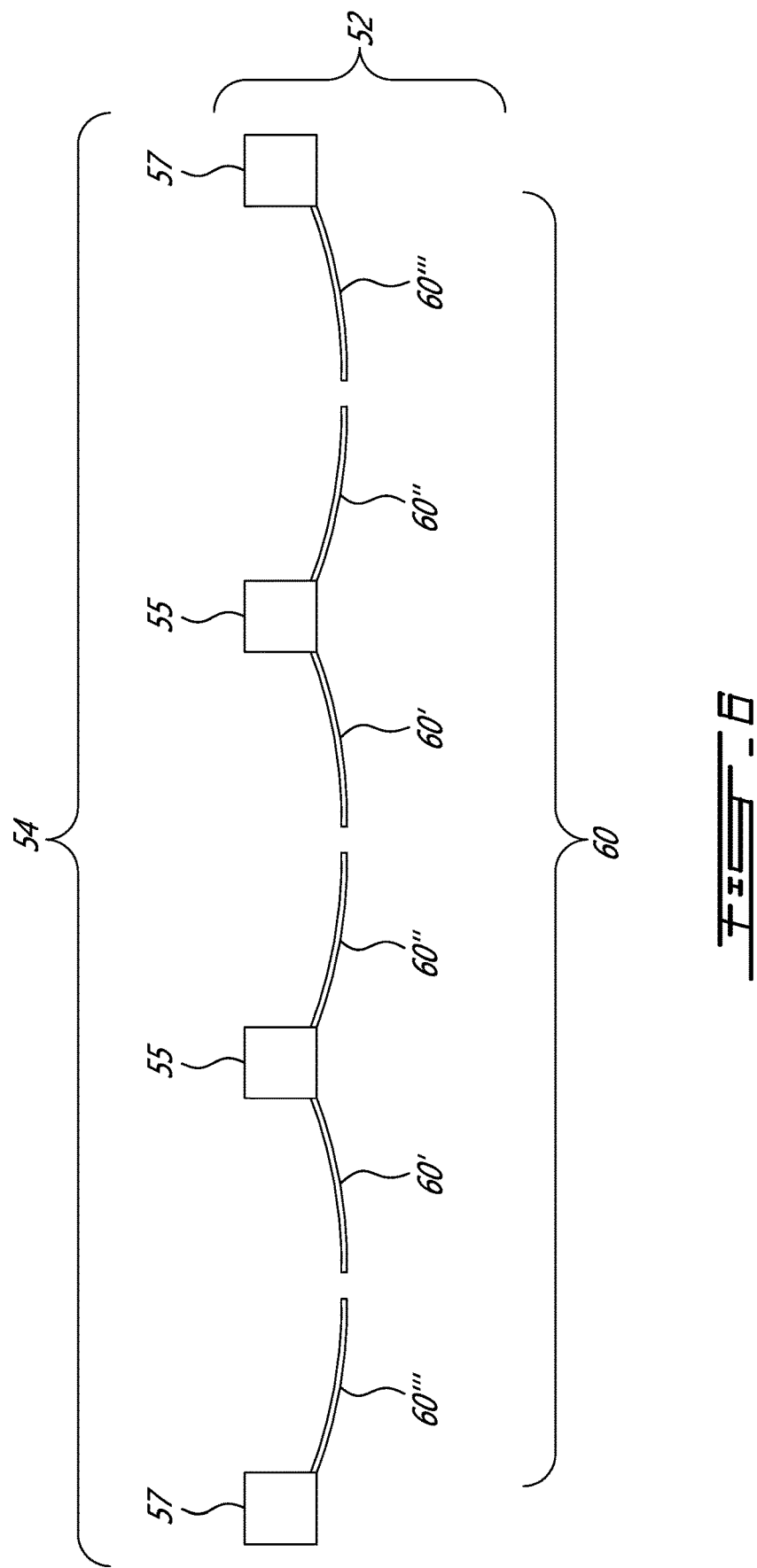

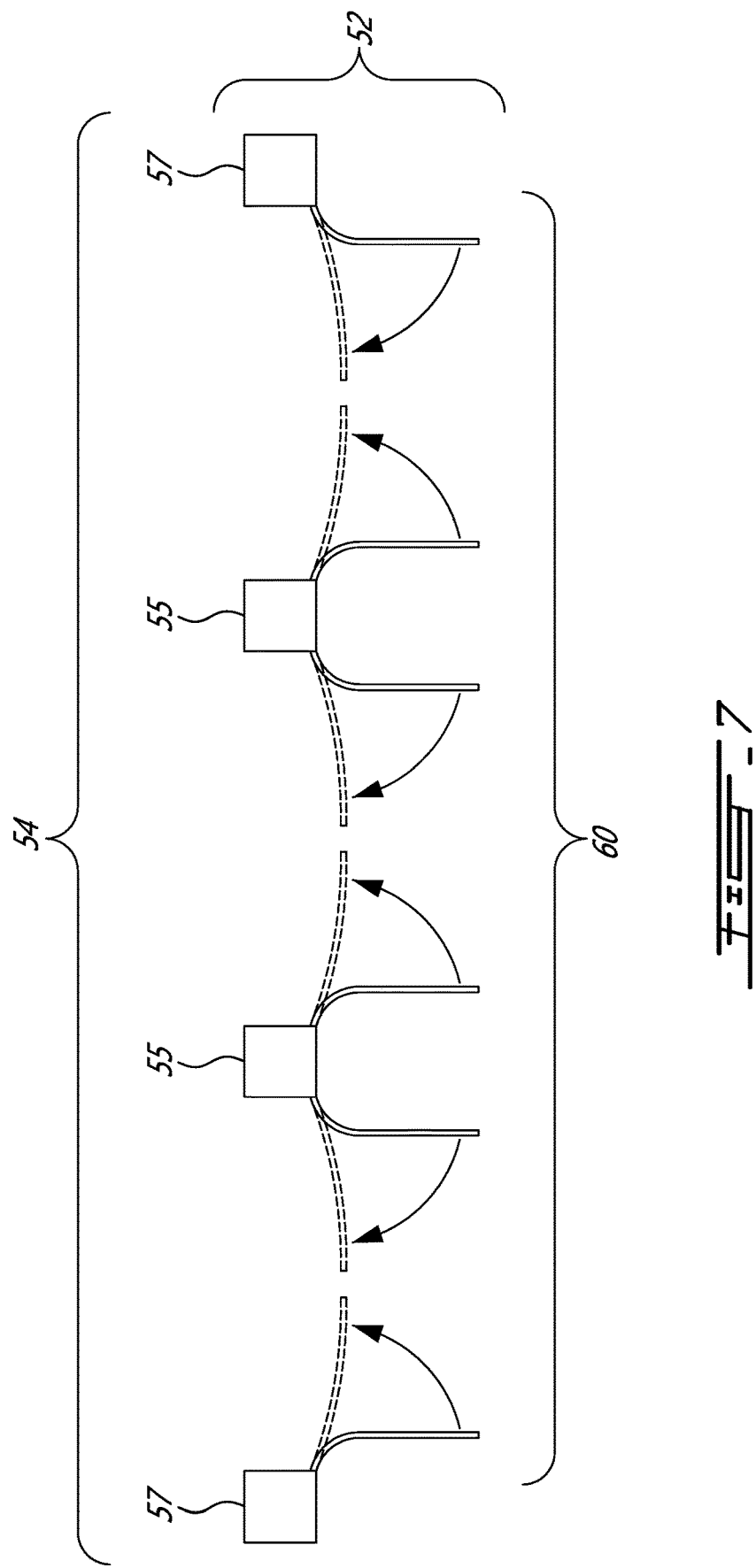

ENGINE ACCESSORY FIRE SHIELD

TECHNICAL FIELD

The disclosure relates generally to aircraft engines, and more particularly to a fire shield for an accessory of such engines.

BACKGROUND

Aircraft engines, and engine accessories, must meet fire safety compliance as part of engine certification. Such engine accessories include heat exchanges, such as oil coolers. Air-cooled oil coolers (ACOC) are commonly used as part of oil and/or fuel systems, and may be particularly susceptible to fire damage because they can include a matrix formed of lightweight cooling fins, which may be brazed in place for example, and this matrix is mounted external to the main engine casing such as to be able to receive an incoming flow of cold air. The melting point of the braze used in the matrix is relative low and can melt under fire conditions, however it can be difficult to protect the matrix because air must be allowed to flow through it during normal operating conditions.

While existing engine accessories are suitable for their intended purposes, there remains a need to be able to better protect aircraft engine accessories, and ACOCs in particular, from fire damage without limiting airflow thereto during normal engine operation.

SUMMARY

There is accordingly provided, an air-cooled oil cooler (ACOC) of an aircraft engine, comprising: a heat transfer matrix located within an airflow passage; and a baffle located upstream of the heat transfer matrix and being deployable in an open position or a closed position, the baffle having fire shield elements formed of a shape memory alloy that passively deform to displace the baffle from the open position to the closed position when the fire shield elements are exposed to temperatures above a predetermined temperature threshold; wherein in the closed position of the baffle the fire shield elements extend across the airflow passage to protect the heat transfer matrix from flames, and in the open position of the baffle the fire shield elements define gaps to allow air flow through the baffle and into the heat transfer matrix.

The ACOC as defined above and described herein may also include one or more of the following features, in whole or in part, and in any combination.

Optionally, and in accordance with the above, the fire shield elements are deformable between a deformed state and a natural state, the baffle being disposed in the open position when the fire shield elements are in the deformed state and the baffle being disposed in the closed position when the fire shield elements are in the natural state.

Optionally, and in accordance with the above, the fire shield elements, when in the deformed state, extend toward the heat transfer matrix in a downstream direction relative to a direction of the air flow through the ACOC.

Optionally, and in accordance with the above, the baffle includes ribs extending across the airflow passage, the ribs having one or more of the fire shield elements mounted thereto.

Optionally, and in accordance with the above, the ribs are substantially parallel to each other and/or substantially equally spaced apart.

Optionally, and in accordance with the above, the ribs include central ribs and lateral ribs, each of the central ribs having a first one of the fire shield elements mounted along a first rib edge and a second one of the fire shield elements mounted along a second rib edge opposite the first rib edge.

Optionally, and in accordance with the above, each of the lateral ribs has a single one of the fire shield elements mounted thereto.

Optionally, and in accordance with the above, the central ribs include at least a first rib and a second rib defining a transverse gap between the first rib and the second rib, and wherein in the closed position of the baffle with the fire shield elements in the natural state, the second one of the fire shield elements of the first rib and the first one of the fire shield elements of the second rib substantially close the transverse gap between the first rib and the second rib.

Optionally, and in accordance with the above, a lateral width of each the fire shield elements is greater than one half of the transverse gap, the first one and the second one of the first shield elements overlapping when in the natural state.

Optionally, and in accordance with the above, a lateral width of each the fire shield elements is less than one half of the transverse gap, thereby ensuring that a minimum gap remains between adjacent ones of the fire shield elements when in the natural state, the minimum gap being smaller than the transverse gap.

There is also provided a fire protection device for an accessory of an aircraft engine, the fire protection device comprising: a baffle located within an airflow passage in communication with the accessory, the baffle including fire shield elements made of a shape memory alloy, the fire shield elements being deformable between a deformed state and a natural state, wherein in the natural state the fire shield elements extend at least partially across the airflow passage to protect the accessory from flames, and in the deformed state the fire shield elements is bent to define one or more gaps between the fire shield elements in the air flow passage thereby allowing airflow through the baffle.

The fire protection device as defined above and described herein may also include one or more of the following features, in whole or in part, and in any combination.

Optionally, and in accordance with the above, the fire shield elements passively deform from the deformed state to the natural state when exposed to temperatures above a predetermined temperature threshold.

Optionally, and in accordance with the above, the fire shield elements, when in the deformed state, extend in a downstream direction relative to a direction of air flow through the airflow passage.

Optionally, and in accordance with the above, the baffle includes ribs extending across the airflow passage, the ribs having one or more of the fire shield elements mounted thereto.

Optionally, and in accordance with the above, the ribs include central ribs and lateral ribs, each of the central ribs having a first one of the fire shield elements mounted along a first rib edge and a second one of the first shield elements mounted along a second rib edge opposite the first rib edge.

Optionally, and in accordance with the above, each of the lateral ribs has a single one of the fire shield elements mounted thereto.

Optionally, and in accordance with the above, the central ribs include at least a first rib and a second rib defining a transverse gap between the first rib and the second rib, and when the fire shield elements are in the natural state, the second one of the fire shield elements of the first rib and the first one of the fire shield elements of the second rib substantially close the transverse gap between the first rib and the second rib.

Optionally, and in accordance with the above, a lateral width of each the fire shield elements is less than one half of the transverse gap, thereby ensuring that a minimum gap remains between adjacent ones of the fire shield elements when in the natural state, the minimum gap being smaller than the transverse gap.

Optionally, and in accordance with the above, the accessory is an air-cooled oil cooler of the aircraft engine.

There is further provided a method of protecting an accessory of an aircraft engine from fire, comprising: preventing frames from impinging on the accessory by closing a baffle located within an airflow passage in communication with the accessory, the baffle including fire shield elements formed of a shape memory alloy and that deform, when exposed to temperatures generated by the fire, from a deformed state to a natural state, the baffle being disposed in an open position when the fire shield elements are in the deformed state and the baffle being disposed in a closed position when the fire shield elements are in the natural state.

BRIEF DESCRIPTION OF THE DRAWINGS

Reference is now made to the accompanying figures in which:

FIG. 3 is a partial perspective view of an air-cooled oil cooler of the oil system of FIG. 2 having a baffle of fire protection device in accordance with the present disclosure, the baffle of the protection device shown in an open position;

FIG. 4 is a partial perspective view of the air-cooled oil cooler and the baffle of the fire protection device of FIG. 3, the baffle of the fire protection device shown in a closed position;

FIG. 5 is an isolated end elevation view of the baffle of the fire protection device as shown in FIG. 3, with the baffle shown in the open position and fire shield elements of the baffle in a deformed state;

FIG. 6 is an isolated end elevation view of the baffle of the fire protection device as shown in FIG. 4, with the baffle in the closed position and the fire shield elements of the baffle in a natural state; and FIG. 7 is an isolated end elevation view of the baffle of the fire protection device, showing deformation of the fire shield elements of the baffle from their deformed state to their natural state, thereby moving the baffle from the open position to the closed position.

DETAILED DESCRIPTION

Figure 1:
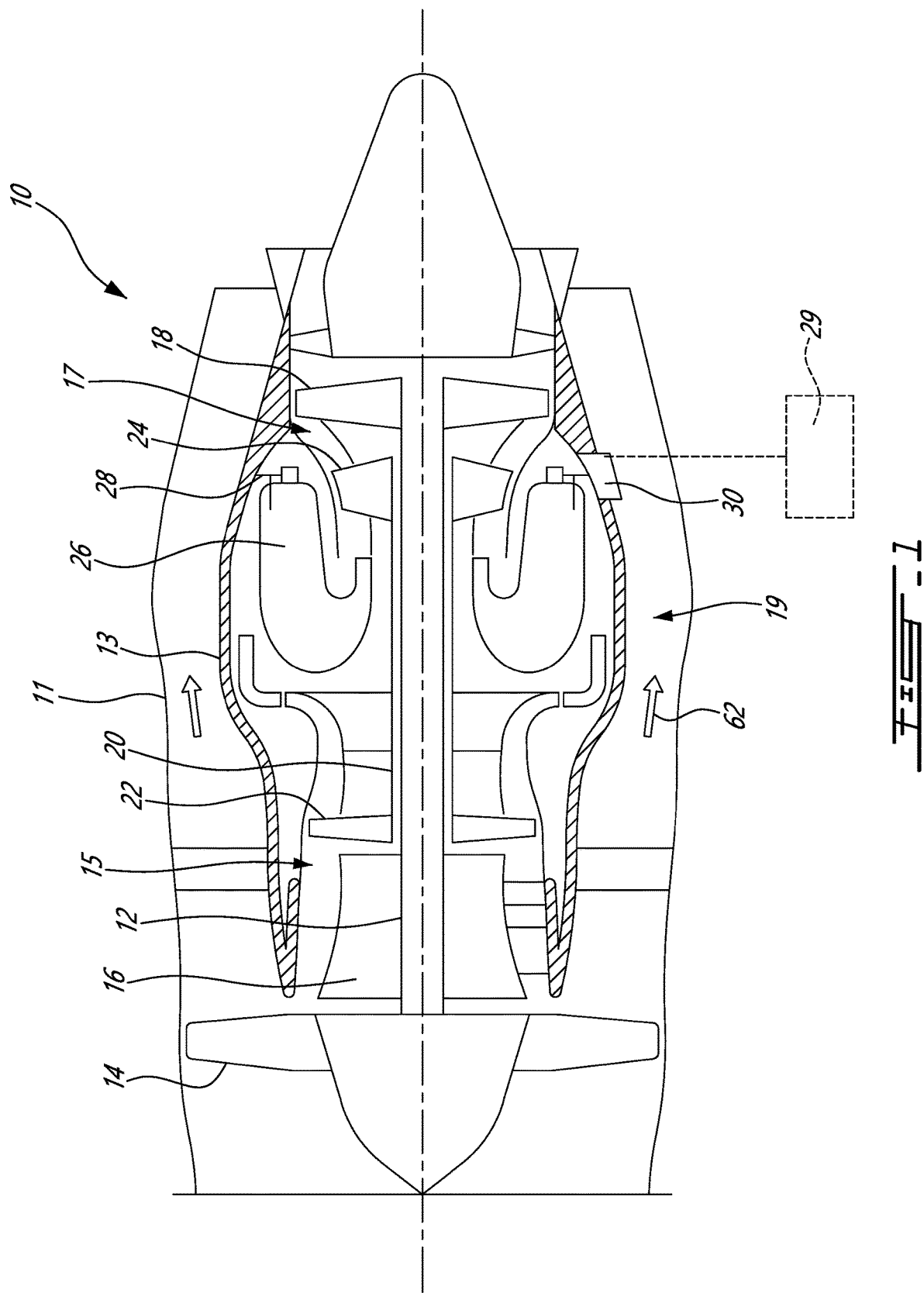
FIG. 1 is a schematic cross sectional view of an aircraft engine.

FIG. 1 illustrates an aircraft engine 10 of a type preferably provided for use in subsonic flight. The aircraft engine (or simply "engine") 10 depicted a gas turbine engine, and more particularly a turbofan engine, that generally comprises in serial flow communication a fan 14 through which ambient air is propelled, a compressor section 15 for pressurizing the air, a combustor 26 in which the compressed air is mixed with fuel and ignited for generating an annular stream of hot combustion gases, and a turbine section 17 for extracting energy from the combustion gases.

In the depicted embodiment, the compressor section 15 includes low pressure compressor 16 that is mounted to a low pressure (LP) shaft 12 and a high pressure compressor 22 that is mounted on a high pressure (HP) shaft 20, and the turbine section 17 includes a high pressure turbine 24 and a low pressure turbine 18. Accordingly, the engine 10 of FIG. 1 is a two spool engine, the LP spool formed by the LP shaft 12 having the low pressure compressor 16 and low pressure turbine 18 mounted thereto, and the HP spool formed by the HP shaft 20 having the high pressure compressor 22 and the high pressure turbine 24 mounted thereto.

These spools, but not the fan 14 which is attached to the LP spool at its forward end upstream of the low pressure compressor 16, are disposed within the engine core that is enclosed within a core casing 13. The core casing 13 surrounds the combustor, and the low and high pressure spool assemblies to define a main flow path or main gas path through the engine 10. An outer housing or nacelle 11 encloses the engine 10 and defines, radially outward thereof, a bypass duct 19 through which bypass airflow 62 flows annularly, radially outward of the core casing 13 and radially inward of the nacelle 11.

The engine 10 also includes a fuel system 28 for supplying fuel to the combustor 26 and an oil system 29 which is in oil flow communication with the engine 10 for providing oil to various engine components (such as bearings, heat exchangers, etc.) for lubrication, cooling and other uses.

One or both of the fuel system 28 and the oil system 29 includes a heat management system 30, for cooling hot oil circulated in the oil system 29 and for heating the fuel prior to being delivered by the fuel system 28 into the combustor 26 for combustion. The heat management system 30 is schematically illustrated in FIG. 1, and does not represent a specific structure and location in the engine.

Figure 2:
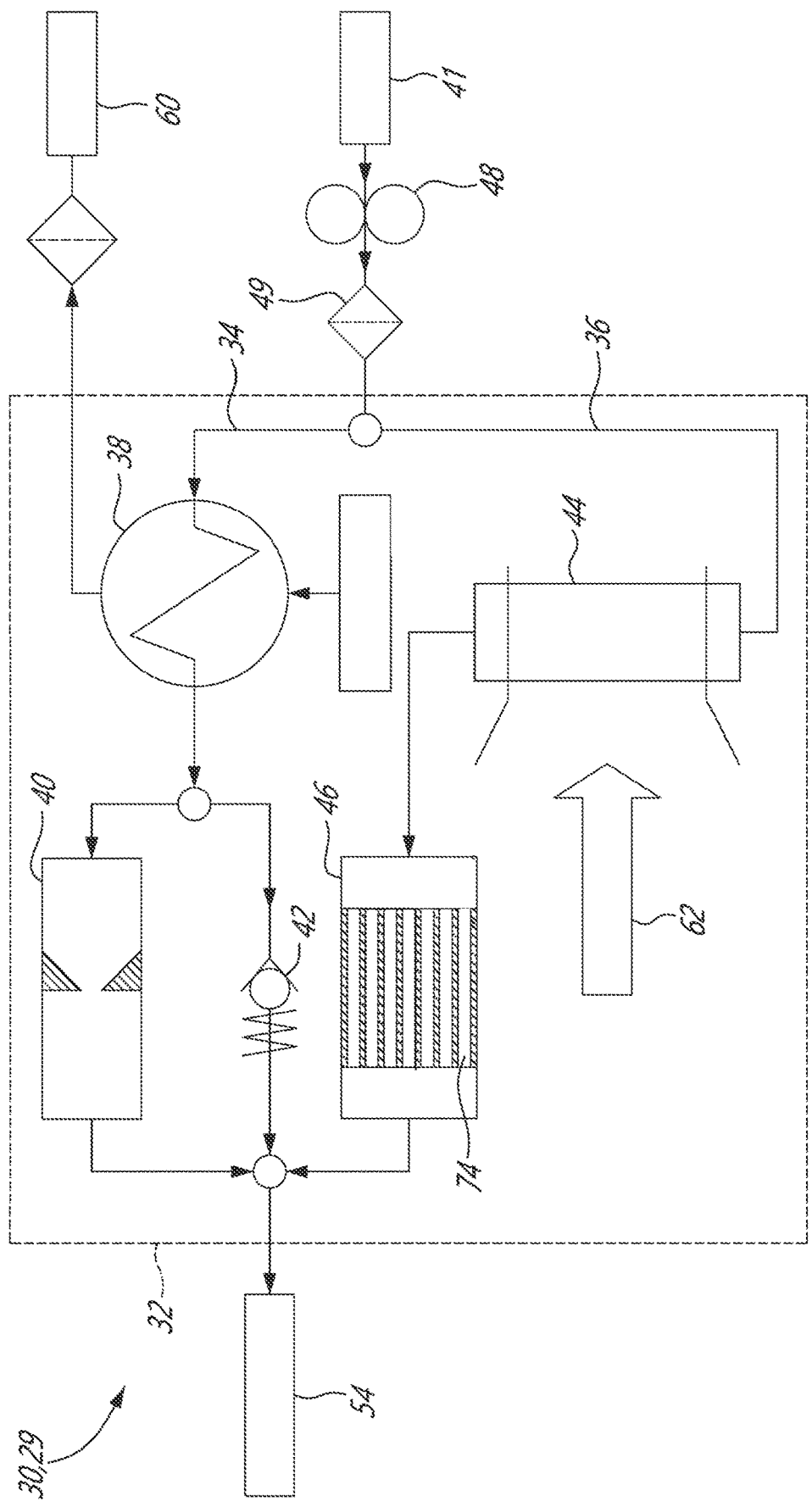
FIG. 2 is schematic illustration of a oil system of the aircraft engine of FIG. 1

Referring now to FIG. 2, the heat management system 30 of the oil system 29 includes an oil circuit 32 illustrated by broken lines in FIG. 2. Although various configurations of the oil circuit 32 are possible, in one exemplary embodiment the oil circuit 32 may include a first branch 34 and a second branch 36 connected in a parallel configuration. The first branch 34 includes a fuel/oil heat exchanger (FOHE) 38 and an FOHE restrictor 40 in series. For example the FOHE restrictor 40 may be disposed downstream of the FOHE 38. Optionally, a pressure relief valve such as a check-valve 42 may also be provided in the first branch 34, for example disposed downstream of the FOHE 38 and parallel to the FOHE restrictor 40.

The second branch 36 includes an air cooled oil cooler (ACOC) 44 and an ACOC restrictor 46 in series.

The heat management system 30 and/or the oil system 29 may further include an oil pump 48 and oil filter 49 which are disposed upstream of and connected to the oil circuit 32 such that oil pump 48 pumps oil from an oil tank 41 which contains relatively hot oil collected from, for example bearing chambers (not shown) of the engine during engine operation, to the oil circuit 32, splitting the oil into first and second oil flows passing through the respective parallel first and second branches 34, 36. The first and second oil flows from the first and second branches 34, 36 are combined and directed into an engine oil manifold 43 which is disposed downstream of and connected to the oil circuit 32. The engine oil manifold 43 distributes the oil to various locations of the engine to lubricate and cool for example bearings and gears of the engine.

The heat management system 30 of the oil system 29 in the engine 10 therefore includes at least one air cooled oil cooler (ACOC) 44, which is used to cool the hot oil to a lower temperature in order to be recycled in an oil circuit of the engine. In the depicted embodiment, the system also includes at least one fuel/oil heat exchanger (FOHE) 38, which is used to transfer heat from the hot oil to the cold fuel in order to heat the cold fuel to a desired temperature.

The ACOC 44 receives cooling airflow therethrough, which in this embodiment is the bypass airflow 62 flowing through the bypass duct 19 of the engine 10. During normal operation of the engine 10, maintaining air flow through the ACOC 44 is important to ensure proper cooling of the oil in the oil system 29. Oil passing through the ACOC 44 is cooled by the air flow and kept within a desired operating temperature range. The ACOC 44 may be mounted external to the core casing 13 of the engine 10, for example within the bypass duct 19, such as to be able to receive an incoming flow of cold air therethrough (e.g., the bypass airflow 62). In alternate embodiments, cold air may be drawn from outside the nacelle 11, using suitable air scoops for example, and directed to the ACOC 44.

In the unlikely event of a fire within or near the engine 10, it is desirable to be able to protect engine accessories, and more particularly heat exchangers from fire and/or the high temperatures generated thereby. The ACOC 44 may for example include an internal heat-exchanger matrix formed of lightweight cooling fins (made of aluminum for example) and these cooling fins may also be brazed in place. The melting point of the braze used in such a matrix and/or of the material of the lightweight cooling fins themselves may be relatively low compared to other components of the engine. This may render the ACOC 44 particularly susceptible to fire damage. Additionally, because of the need for the ACOC 44 to be positioned within the engine such as to receive cooling airflow therethrough, it can be difficult to protect from fire damage because of the need for it to maintain airflow therethrough during normal operation.

Referring now to FIGS. 3 and 4, a fire protection device 50 is provided which is located within an air flow path proximate to the ACOC 44 (or other engine accessory) to be protected. The fire protection device 50 may be integrated directly into the ACOC 44, for example at or adjacent to an air inlet 47 of the ACOC 44, or may be separate from the ACOC 44 but mounted in close proximity thereto—either immediately upstream of the ACOC 44 or, alternately, immediately downstream thereof. In FIGS. 3 and 4, the fire protection device 50 is shown as being spaced apart in a stream-wise direction (i.e., in the direction of air flow F through the ACOC 44) from the heat transfer matrix 45 of the ACOC 44. The stream-wise spacing as shown in FIGS. 3 and 4 is provided for ease of comprehension. It is however to be understood that the fire protection device 50 as described herein may also be integrated directly into the ACOC 44—i.e. without any significant stream-wise spacing between the baffle 52 of the fire protection device 50 and the heat transfer matrix 45 of the ACOC 44. In certain embodiments, the fire protection device 50 also be installed either upstream or downstream of the heat transfer matrix 45 of the ACOC 44, for example within an air flow passage 51 (defined by a duct or other suitable structure) leading to or extending from the ACOC 44, or alternately the fire protection device 50 may be. Regardless of the positioning of the fire protection device 50 relative to the ACOC 44, the fire protection device 50 is located such as to block, either entirely or partially, flames from reaching the ACOC 44 such as to protect the ACOC 44 in the event of a fire condition.

Referring still to FIGS. 3 and 4, the fire protection device 50 includes a baffle 52 located proximate to the heat transfer matrix 45 of the ACOC 44. In the embodiment of FIGS. 3 and 4, the baffle 52 is located upstream of the heat transfer matrix 45 of the ACOC 44, relative to the direction of air flow F through the ACOC 44. As noted above, however, in certain embodiments the baffle 52 may alternately be located downstream of the heat transfer matrix 45 of the ACOC 44. In yet another embodiment, the fire protection device 50 includes two baffles 52, one located upstream of the heat transfer matrix 45 of the ACOC 44 and one located downstream thereof.

The baffle 52 includes one or more ribs 54 that extend across an opening O, in plane P that is substantially transverse to the direction of air flow F through the ACOC 44. In the depicted embodiment, the ribs 54 extend longitudinally through the air flow passage 51 and across a full dimension of opening O above the ACOC 44, between a first end 56 and a longitudinally spaced-apart second end 58 of the baffle 52. Any suitable number of ribs 54 may be provided, and the number selected will depend on the size of the ACOC 44 and/or of the opening to be protected from fire. In the depicted embodiment, the ribs 54 of the baffle 52 include at least two central ribs 55 which are located between opposed lateral edges 51' of the baffle 52. The ribs 54 of the baffle 52 also include two lateral ribs 57, each of which is located on a respective lateral edge 51' of the baffle.

In the depicted embodiment, the ribs 54 are substantially parallel to one another and substantially equally spaced apart within the plane P to define air flow gaps of a common size between adjacent pairs of ribs. However, in certain embodiments, the spacing between adjacent ribs may be uneven and/or the ribs may not be parallel to another.

Referring now to FIGS. 5-7, in addition to FIGS. 3-4, each of the ribs 54 of the baffle 52 have one or more fire shield elements 60 mounted thereto. As will be described in further detail, the fire shield elements 60 (which may also be referred to as fire shield fins) are formed of a shape memory alloy and thus will passively deform between two states, each defining a different relative position positions relative to the ribs 54. The term "passively deform" or "passively deformable" as used herein is understood to mean that the fire shield elements will deform of their own accord, without external actuation or force being applied thereto, in response to a change in temperature. Generally, the fire shield elements 60 as described herein will maintain one of two states, namely a deformed state which defines an open position of the baffle and a natural state which defines a closed position of the baffle. The state, and thus respective position, of the fire shield elements will depend on the temperature to which they are exposed.

In the embodiment of FIGS. 3 and 4, each of the central ribs 55 has a pair of first shield elements 60 mounted thereto, and each of the lateral ribs 57 has one fire shield element 60 mounted thereto. In all cases, the fire shield elements 60 extends a complete length of the respective rib between the first and second ends 56, 58 thereof.

More particularly, and as seen in FIGS. 5-6, each of the central ribs 55 has a first one 60' of the fire shield elements 60 is mounted along a first rib edge 72 and a second one 60" of the first shield elements 60 mounted along a second rib edge 74 opposite the first rib edge 72. The lateral ribs 57, being located on a respective lateral edge of the baffle 52, have only a single fire shield element 60'" mounted thereto on a lateral inner edge of the lateral rib 57.

Each of the fire shield elements 60 has a lateral width that is selected based on the size of the lateral gaps between adjacent pairs of ribs 54, wherein the lateral width of each fire shield element 60 (when in their natural state and thus extending within the plane P transversely across the airflow passage) corresponds to about half of a lateral distance between pairs of adjacent ribs 54. Stated differently, each transverse gap between adjacent ribs 54 is approximately two times a lateral width of the fire shield elements 60. For example, if one considers two central ribs as including a first rib and a second rib that define a transverse gap between the first and second ribs (through which air can flow when the baffle is in its open position), when the baffle is deformed into the closed position with the fire shield elements in their natural state, the second one of the fire shield elements of the first rib will meet the first one of the fire shield elements of the second rib to thereby substantially close the transverse gap between the first rib and the second rib. As such, in this natural state the fire shield elements, they substantially close the transverse gap between the ribs thereby substantially blocking the air flow passage and protecting the heat transfer matrix of the ACOC. In certain embodiments, the lateral width of the fire shield elements 60 may be greater than one half of the transverse gap between the ribs, such that the fire shield elements 60 overlap when in their natural state.

The fire shield elements 60 (collectively, the fire shield elements 60', 60" and 60'") of the baffle 52 are formed of a shape memory alloy. A shape memory alloy (SMA) is a metal alloy that can be deformed when cold but returns to its pre-deformed ("remembered" or "natural") shape when heated. In certain embodiments, the shape memory alloy of the fire shield elements 60 may be an alloy of nickel and titanium (e.g., Nitinol). Thus, the fire shield elements 60 of the baffle 52 can accordingly maintain either a first shape or position or a second shape or position, depending on the temperature to which the fire shield elements 60 are exposed.

The fire shield elements 60 of the baffle 52 are accordingly installed in a deformed position (as shown in FIGS. 3 and 5) and maintain this deformed position, i.e., an open position of the baffle 52, during normal operation of the engine 10. In this position, air is allowed to flow through the baffle 52 to the ACOC 44. However, when the fire shield elements 60 of the baffle 52, which are formed of a SMA, are exposed to temperatures above a predetermined temperature threshold typical of fire within an aircraft engine, the SMA material will cause the fire shield elements 60 to deform and return to their natural (or un-deformed) position (as shown in FIGS. 4 and 6). The SMA fire shield elements 60 are thus selected such that in their installed state (FIGS. 3 and 5) they are open to allow airflow through the baffle 52 and thereby allow air to flow downstream to the ACOC 44. In the event of a fire, the heat generated will cause the SMA fire shield elements 60 to deform (as shown in FIG. 7) and return to their "natural" shape (FIGS. 4 and 6), wherein of they extend across the air flow passage 51 and thereby protect the downstream ACOC 44 by limiting the ability of flames and/or heat from reaching the ACOC 44 in the event of a fire. The fire shield elements 60, when in their natural state defining the closed position of the baffle, will at least partially obstruct airflow through the baffle 52. However, from the point of view of ensuring fire safety, the fire shield elements 60 need not fully prevent air flow through the baffle 52. In fact, in certain circumstances, it may be desirable to permit a limited amount of airflow through the baffle 52. This may be accomplished, for example, by ensuring that a minimum gap in the transverse direction remains between adjacent fire shield elements 60 when in their extended, natural state. The fire shield elements 60 in their natural state will still act to protect the ACOC 44 or other engine accessary from a flame, however a limited airflow through this minimum gap between extended fire shield elements 60 may provide cooling flow to the ACOC or other accessory, and may even deflect the frames away from the accessory.

This may be accomplished, for example, by ensuring that a lateral width of each the fire shield elements is less than one half of the transverse gap between the ribs, thereby ensuring that a minimum gap remains between adjacent ones of the fire shield elements when in the natural state. This minimum gap being smaller than the transverse gap defined between ribs or between the adjacent fire shield elements when in their deformed position.

Accordingly, in FIGS. 3 and 5, the fire shield elements 60 of the baffle 52 are positioned in their deformed state, which defines an open position of the baffle 52. In this open position of the baffle, air is permitted to readily flow through the baffle 52 to reach the ACOC 44. In FIGS. 4 and 6, the fire shield elements 60 are positioned in their natural state, which defines a closed position of the baffle 52. In its closed position, the baffle 52 protects the ACOC 44 by preventing or limiting exposure of the ACOC to flames generated by a fire condition. FIG. 7 shows the deformation of the first shield elements 60, from their deformed state (open baffle) to their natural state (closed baffle), which deformation will occur when the SMA fire shield elements 60 are exposed to temperatures above the above-mentioned threshold temperature.

As seen in FIGS. 3, 5 and 7, when the fire shield elements 60 are located in their deformed state (i.e., the baffle 52 is disposed in its open position), the fire shield elements 60 are preferably bent in a downstream direction relative to the direction of airflow F through the ACOC 44. In other words, when the baffle 52 is located upstream of the ACOC 44, as shown in FIG. 3, the fire shield elements 60 are deformed to extend in a downstream direction, towards the ACOC 44. This orientation of the fire shield elements 60, in a downstream direction, will help prevent the airflow F passing through the baffle 52 from bending the baffles back towards a closed position (which could restrict air flow and thus impeded efficient operation of the ACOC 44). Instead, by being deformed in a downstream direction as shown in FIGS. 3 and 5, the fire shield elements 60 will tend to be pushed further open by the airflow F during normal operation of the engine 10. As noted above, in alternate embodiments the baffle 52 may be installed at the outlet of the ACOC 44, or downstream thereof. In that case, the fire shield elements 60 will still be deformed in a downstream direction, in this case away from the ACOC, to ensure that the airflow F through the ACOC during normal engine operation will tend to force the fire shield elements 60 open rather than closed.

The fire protection device 50 therefore provides a deployable baffle 52 that is mounted proximate to the ACOC 44, for example immediately upstream thereof (i.e., without any intervening components between the baffle 52 and the ACOC 44). The deployable baffle 52 will remain open (FIGS. 3 and 5) during normal operation of the engine 10, but will close (FIGS. 4 and 6) when exposed to high temperatures such as those generated by a fire, thereby protecting the ACOC 44 from the fire by limiting the ability of flames and/or hot air rom reaching the ACOC. The fire protection device 50 accordingly provides a deployable baffle 52, with deformable shape memory alloy (SMA) fire shields, for use as a fire protection device in an aircraft engine.

The present fire shield uses Shape Memory Alloy (SMA) as a baffle to protect the air fins/matrix of an air cooler (or any heat exchanger with air flowing through it). The baffle is made so that it's natural state acts as a wall to block any flame from reaching the heat transfer matrix. When installed on the component, the baffle fins would be bent "open" to allow airflow to pass into the cooler. In the case of a fire, the heat of the flame would return the baffle fins to their original/natural state to close and protect the component from the flame.

The embodiments described in this document provide non-limiting examples of possible implementations of the present technology. Upon review of the present disclosure, a person of ordinary skill in the art will recognize that changes may be made to the embodiments described herein without departing from the scope of the present technology. While the ACOC 44 has bee described herein as being the engine accessory and/or heat exchanger that is protected using the fire protection device of the present disclosure, it is to be understood that the fire protection device described herein may be used to protect any accessory of the engine 10 or in fact any suitable component of the engine 10 that may require protection from fire and/or high temperatures generated in the event of a fire condition. The oil circuit of the heat management system as described above, may be alternatively positioned to receive used hot oil from bearing chambers and to discharge cooled oil to an oil tank of the engine. Yet further modifications could be implemented by a person of ordinary skill in the art in view of the present disclosure, which modifications would be within the scope of the present technology.

The invention claimed is:

1. An air-cooled oil cooler (ACOC) of an aircraft engine, comprising:
   a heat transfer matrix located within an airflow passage; and
   a baffle located upstream of the heat transfer matrix, the baffle having one or more ribs transversely extending across an opening of the airflow passage between a first rib end located on a first side of the airflow passage and a second rib end located on a second side of the airflow passage opposite the first side, and one or more fire shield elements extending away from the one or more ribs of the baffle, an entirety of the fire shield elements being formed of a shape memory alloy and configured to passively deform between an open position and a closed position of the fire shield elements when the fire shield elements are exposed to temperatures above a predetermined temperature threshold;
   wherein in the closed position the fire shield elements extend across the airflow passage to protect the heat transfer matrix from flames, and in the open position the fire shield elements define gaps to allow an air flow through the baffle and into the heat transfer matrix.

2. The ACOC as defined in claim 1, wherein the fire shield elements are deformable between a deformed state and a natural state, the fire shield elements being disposed in the open position when the fire shield elements are in the deformed state and the fire shield elements being disposed in the closed position when the fire shield elements are in the natural state.

3. The ACOC as defined in claim 2, wherein the fire shield elements, when in the deformed state, extend toward the heat transfer matrix in a downstream direction relative to a direction of the air flow through the ACOC.

4. The ACOC as defined in claim 1, wherein the one or more ribs include a plurality of ribs that are substantially parallel to each other and/or substantially equally spaced apart.

5. The ACOC as defined in claim 1, wherein the one or more ribs include one or more central ribs and one or more lateral ribs, each of the one or more central ribs having a first one of the fire shield elements mounted along a first rib edge and a second one of the fire shield elements mounted along a second rib edge opposite the first rib edge.

6. The ACOC as defined in claim 5, wherein each of the one or more lateral ribs has a single one of the fire shield elements mounted thereto.

7. The ACOC as defined in claim 5, wherein the one or more central ribs include at least a first rib and a second rib defining a transverse gap between the first rib and the second rib, and wherein in the closed position of the baffle with the fire shield elements in a natural state, the second one of the fire shield elements of the first rib and the first one of the fire shield elements of the second rib substantially close the transverse gap between the first rib and the second rib.

8. The ACOC as defined in claim 7, wherein a lateral width of each the fire shield elements is greater than one half of the transverse gap, the first one of the fire shield elements and the second one of the fire shield elements overlapping when in the natural state.

9. The ACOC as defined in claim 7, wherein a lateral width of each the fire shield elements is less than one half of the transverse gap, thereby ensuring that a minimum gap remains between adjacent ones of the fire shield elements when in the natural state, the minimum gap being smaller than the transverse gap.

10. A fire protection device for an accessory of an aircraft engine, the fire protection device comprising:
    a baffle located within an airflow passage in communication with the accessory, the baffle including one or more ribs transversely extending across an opening of the airflow passage between a first rib end located on a first side of the airflow passage and a second rib end located on a second side of the airflow passage opposite the first side, one or more fire shield elements being mounted to each of the one or more ribs, an entirety of the fire shield elements being made of a shape memory alloy, the fire shield elements being deformable between a deformed state and a natural state, wherein in the natural state the fire shield elements formed of the shape memory alloy extend away from the ribs and at least partially across the opening of the airflow passage to protect the accessory from flames, and in the deformed state the fire shield elements are bent to define one or more gaps between the fire shield elements in the air flow passage thereby allowing airflow through the baffle.

11. The fire protection device of claim 10, wherein the fire shield elements passively deform from the deformed state to the natural state when exposed to temperatures above a predetermined temperature threshold.

12. The fire protection device of claim 10, wherein the fire shield elements, when in the deformed state, extend in a downstream direction relative to a direction of air flow through the airflow passage.

13. The fire protection device of claim 10, wherein the accessory is an air-cooled oil cooler of the aircraft engine.

14. A fire protection device for an accessory of an aircraft engine, the fire protection device comprising:
    a baffle located within an airflow passage in communication with the accessory, the baffle including a plurality of fire shield elements mounted to a mounting edge on the baffle, the plurality of fire shield elements being made of a shape memory alloy, the fire shield elements being deformable between a deformed state and a natural state, wherein in the natural state the fire shield elements formed of the shape memory alloy extend away from the mounting edge and at least partially across the airflow passage to protect the accessory from flames, and in the deformed state the fire shield elements are bent to define one or more gaps between the fire shield elements in the air flow passage thereby allowing airflow through the baffle; and wherein the baffle includes a plurality of ribs extending across the airflow passage, the plurality of ribs having one or more of the fire shield elements mounted thereto, and the plurality of ribs include one or more central ribs and one or more lateral ribs, each of the one or more central ribs having a first one of the fire shield elements mounted along a first rib edge and a second one of the fire shield elements mounted along a second rib edge opposite the first rib edge.

15. The fire protection device of claim 14, wherein each of the one or more lateral ribs has a single one of the fire shield elements mounted thereto.

16. The fire protection device of claim 14, wherein the one or more central ribs include at least a first rib and a second rib defining a transverse gap between the first rib and the second rib, and when the fire shield elements are in the natural state, the second one of the fire shield elements of the first rib and the first one of the fire shield elements of the second rib substantially close the transverse gap between the first rib and the second rib.

17. The fire protection device of claim 16, wherein a lateral width of each the plurality of fire shield elements is less than one half of the transverse gap, thereby ensuring that a minimum gap remains between adjacent ones of the fire shield elements when in the natural state, the minimum gap being smaller than the transverse gap.

* * * * *